United States Patent [19]
Ghezzo et al.

[11] Patent Number: 6,127,812
[45] Date of Patent: Oct. 3, 2000

[54] INTEGRATED ENVIRONMENTAL ENERGY EXTRACTOR

[75] Inventors: Mario Ghezzo, Ballston Lake; Paul Andrew Frank, Albany; John Erik Hershey, Ballston Lake, all of N.Y.

[73] Assignee: General Electric Company, Schenectady, N.Y.

[21] Appl. No.: 09/250,923

[22] Filed: Feb. 16, 1999

[51] Int. Cl.$^7$ ...................................................... H02J 2/00
[52] U.S. Cl. ............................................. 320/166; 307/110
[58] Field of Search ..................................... 320/166, 167; 307/110; 363/59, 61, 62

[56] References Cited

U.S. PATENT DOCUMENTS

| | | | |
|---|---|---|---|
| 3,005,305 | 10/1961 | Thoma | 368/158 |
| 3,013,201 | 12/1961 | Goldie | 310/309 |
| 3,094,653 | 6/1963 | LeMay et al. | 310/309 |
| 4,054,826 | 10/1977 | Wahlstrom | 310/308 |
| 4,127,804 | 11/1978 | Breaux | 310/308 |
| 4,402,524 | 9/1983 | D'Antonio et al. | 280/612 |
| 4,730,287 | 3/1988 | Yoshino et al. | 368/205 |
| 4,732,457 | 3/1988 | Lafonta et al. | 359/245 |
| 4,890,616 | 1/1990 | Pinckaers | 607/2 |
| 5,354,979 | 10/1994 | Adelson et al. | 235/491 |
| 5,889,389 | 3/1999 | Bothra et al. | 320/166 |
| 5,905,371 | 5/1999 | Limpaecher | 320/166 |
| 5,955,961 | 9/1999 | Wallerstein | 340/380 |

OTHER PUBLICATIONS

Mehran Mehregany, "Microelectromechanical Systems", Circuits and Devices, Jul. 1993 IEEE, pp. 14–22.

Keren Deng, Mehran Mehregany, "A Simple Fabrication Process For Polysilicon Side–Drive Micromotors", Journal of Microelectromechanical Systems, vol. 3, No. 4, Dec. 1994, pp/ 126–133.

S. Tom Picraux, Paul J. McWhorter, "The Broad Sweep of Integrated Microsystems", IEEE Spectrum, Dec. 1998, pp. 24–33.

Roger T. Howe, Richard S. Muller, Kaigham J. Gabriel, William S.N. Trimmer, "Silicon Micromechanics: sensors and actuators on a chip", IEEE Spectrum, Jul. 1990, pp. 29–31, 34–35.

Kurt E. Petersen, "Silicon As A Mechanical Material", Proceedings of the IEEE, vol. 70, No. 5, May 1982, 420–457.

Farzad Pourahmadi, Lee Christel, Kurt Petersen, Jospeh Mallon, Janusz Bryzek, Variable–Flow Micro–Valve Structure Fabricated With Silicon Fusion Bonding, IEEE Solid–State Sensor And Actuator Workshop, Hilton Head, SC Jun. 4–7, 1990, pp. 78–81.

Martin A. Schmidt, Roger T. Howe, Stephen D. Senturia, Jospeh H. Haritonidis, "Design and Calibration of a Microfabricated Floating–Element Shear–Stress Sensor", IEEE Transactions On Electron Devices, vol. 35, No. 6, Jun. 1988, pp. 750–757.

(List continued on next page.)

*Primary Examiner*—Peter S. Wong
*Assistant Examiner*—Lawrence Luk
*Attorney, Agent, or Firm*—Ann M. Agosti; Douglas E. Stoner

[57] ABSTRACT

In embodiments of the present invention, an energy extractor includes a capacitor which experiences capacitance and voltage changes in response to movement of a capacitor plate or of a dielectric material. In one embodiment, a third plate is positioned between first and second plates to create two capacitors of varying capacitances. In another embodiment, one capacitor plate is attached by flexible arms which permit movement across another capacitor plate. The above capacitors can be used singularly or with one or more other capacitors and are rectified either individually or in a cascaded arrangement for supplying power to a rechargeable energy source. The above capacitors can be fabricated on a substrate along with supporting electronics such as diodes.

20 Claims, 10 Drawing Sheets

OTHER PUBLICATIONS

W.H. Juan, S.W. Pang, "High–Aspect–Ratio Si Vertical Micromirror Arrays for Optical Switching", Journal of Microelectromechanical Systems, vol. 7, No. 2, Jun. 1998, pp. 207–213.

Paul B. Koeneman, Ilene J. Busch–Vishniac, Kristin L. Wood, "Feasibility of Micro Power Supplies for MEMS, Switching", Journal of Microelectromechanical Systems, vol. 6, No.4, Dec. 1997, pp. 355–362.

Arjun Selvakumar, Khalil Najafi, "A High–Sensitivity Z–Axis Capacitive Silicon Microaccelerometer with A Torsional Suspension", Switching, Journal of Microelectromechanical Systems, vol. 7, No. 2, Jun. 1998, pp. 192–200.

NH Tea, V Milanovic, CA Zincke, JS Suehle, M Gaitan, ME Zaghloul, J Geist, "Hybrid Postprocessing Etching for CMOS–Compatible MEMS", Switching, Journal of Microelectromechanical Systems, vol. 6, No. 4, Dec. 1997, pp. 363–372.

Michael P. Timko, "A Two–Terminal IC Temperature Transducer", IEEE Journal of Solid–State Circuits, vol. SC–11, No. 6, Dec. 1976, pp. 784–788.

JW Weigold, SW Pang, "Fabrication of Thick Si Resonators with a Frontside–Release Etch–Diffusion Process", Switching, Journal of Microelectromechanical Systems, vol. 7, No. 2, Jun. 1998, pp. 201–206.

AP Pisano, "Microelectromechanical Systems", wysiwyg://contentframe.3/http://web. . . il/ETO/MEMS/MEMS–OV/showslide.html? Feb. 5, 1999.

INTEGRATED ENVIRONMENTAL ENERGY EXTRACTOR

BACKGROUND OF THE INVENTION

The present invention relates generally to energy sources for physically small, low power systems.

Mehregany, "Microelectromechanical Systems," IEEE Circuits and Devices, July 1993, pp. 14–22, for example, describes integrated circuit fabrication processes which can be used to produce micronsized mechanical devices for combination with integrated electronics. As described by Mehregany, microelectromechanical systems (MEMS) techniques have been used to fabricate a great variety of mechanical microstructures, including beams, diaphragms, grooves, orifices, sealed cavities, pyramids, needles, springs, complex mechanical suspensions, gears, linkages, and micromotors. MEMS are fabricated on silicon, for example, by appropriately combining etch masks and etch-stop patterns with anisotropic etchants. Surface micromachining relies on forming specific structural parts of a device over layers or regions of a sacrificial material which is later dissolved in a chemical etchant that does not attack the structural parts. MEMS devices require a power source for operation which is often in the form of an electrical power supply.

The availability and durability of power supplies are becoming increasingly significant factors for many electronic systems. Many microelectronic systems are requiring less power than in the past because of more energy-efficient designs, but they require some power nonetheless. These power requirements can create difficulties for systems that include electronics but are not easily recharged by outside sources. Such systems include electronic storage and data manipulation systems such as sensor systems deployed in remote areas or areas to which access is not readily available, and multi-function (balance calculating, inventory taking, etc.) credit cards and instruments, for example.

Wahlstrom, U.S. Pat. No. 4,054,826, describes an apparatus for charging batteries by converting random mechanical motion into electrical energy. Diodes are positioned in the circuit so that as electrical charge passes between capacitors, the current formed thereby passes through the battery and charges it. In one embodiment, two variable capacitors and a bias supply are connected to a battery with the variable capacitors having their capacitance varied in an alternating manner by the physical displacement of a conductive member that forms one plate in each of the capacitors. From the text and description, it appears that the electrical connection to the conductive member is through a conductive housing in which the conductive member is displaced. Consequently, free movement and friction of the conductive member in the housing may reduce the strength of the electrical contact between the conductive member and the conductive housing. In another embodiment, the capacitance is varied by having a conductive liquid, such as mercury, move alternately between two sets of capacitor plates. Mercury liquid is environmentally toxic. Liquids in general have disadvantages of potentially high vapor pressure, dampening viscosity, and stress on the container walls resulting from a high coefficient of thermal expansion.

Furthermore, the above embodiments apply to electromechanical systems which are assembled by conventional "pick-and-place" techniques using discrete manufactured parts. These techniques are too coarse and costly for use in micropower supplies compatible with MEMS devices.

SUMMARY OF THE INVENTION

Thus there is a particular need for a non-toxic physically small power supply that can reliably extract sufficient energy from the environment in which a low power MEMS system operates.

In embodiments of the present invention, an energy extractor includes a capacitor which experiences capacitance and voltage changes in response to movement of a capacitor plate. In one embodiment, a flexible second plate is positioned between first and third plates to create two capacitors of varying capacitances. In another embodiment, one capacitor plate is attached by at least one flexible arm which permits movement towards or across another capacitor plate. The above capacitors can be used singularly or with one or more other capacitors so that the capacitor current can be rectified either individually or in a cascaded arrangement for supplying power to a rechargeable energy source.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
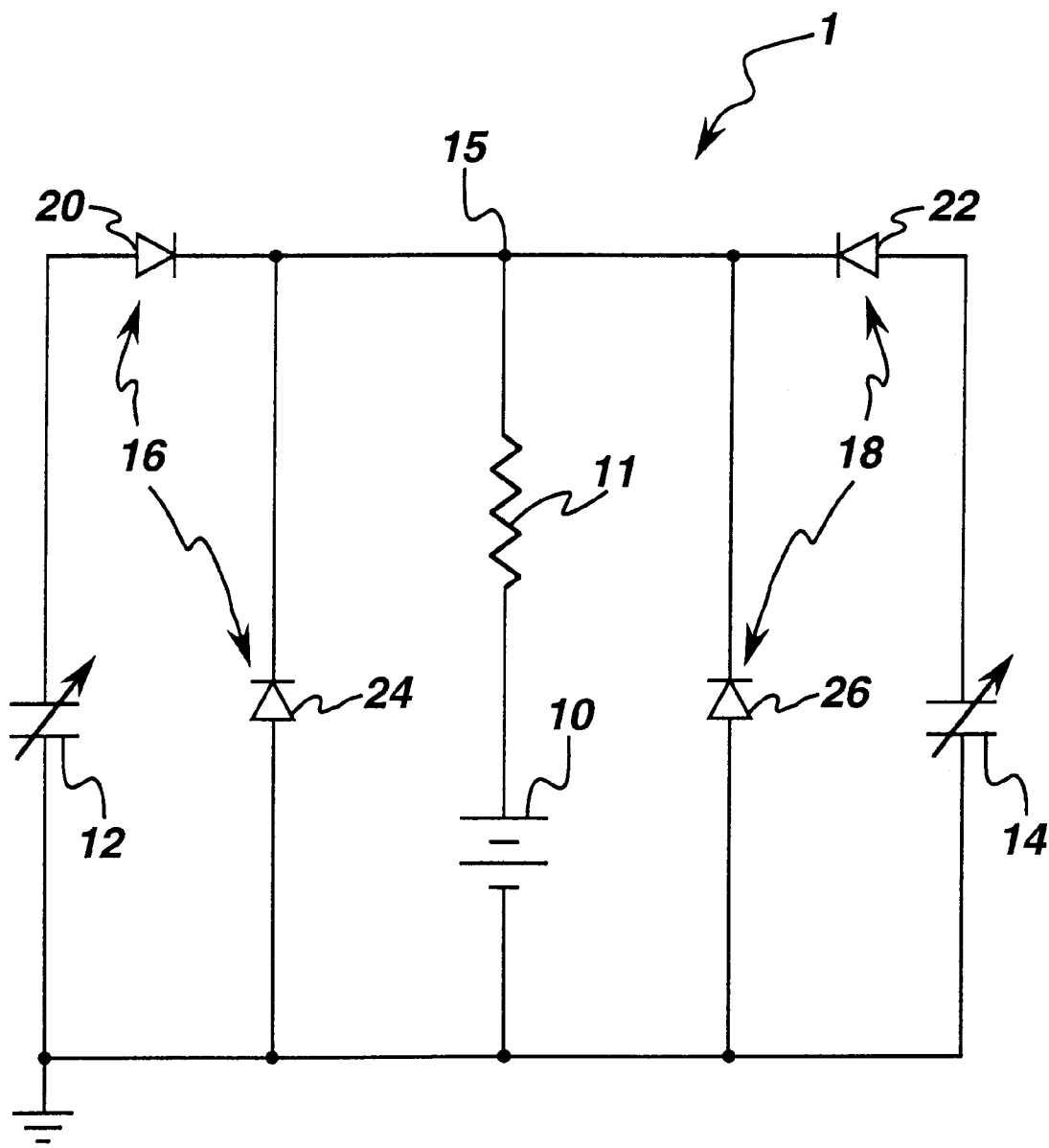
FIG. 1 is a circuit diagram of one embodiment of a charging circuit of the present invention.

In the circuit diagram of FIG. 1, the present invention is embodied in an integrated environmental energy extractor 1 charging circuit. FIG. 1 includes a rechargeable energy source 10 coupled in parallel between diodes 24 and 26 of first and second rectifiers 16 and 18, which in turn are respectively coupled in parallel to first and second capacitors 12 and 14. Each rectifier permits current to flow from the respective capacitor to the rechargeable energy source when the capacitor exceeds a predetermined voltage and substantially prevents current from flowing from the rechargeable energy source to the capacitor.

In a preferred embodiment, each rectifier includes first and second diodes (diodes 20 and 24 for rectifier 16 and diodes 22 and 26 for rectifier 18) coupled at a common junction 15 to energy source 10, oriented in an opposing direction and having low forward diode voltages. In one embodiment, the diodes are fabricated such that about 0.1 volt is needed to produce about 1 milliamperes. If diodes are not used, switches and control logic (not shown) can be used to provide the rectification.

Rechargeable energy source 10 may comprise any type and voltage level of energy source which does not cause reverse breakdown of the rectifiers. Examples include, generally, batteries and accumulators, and, more specifically, nickel metal hydride batteries and nickel cadmium batteries and accumulators. Typically a battery has internal resistance as represented by resistor 11. In one embodiment, the rechargeable energy source voltage is about 20 volts and the internal resistance is about 50 ohms.

Capacitors 12 and 14 comprise capacitors subject to a force which mechanically alters the capacitances and changes the voltage across at least one the capacitors. Typically the capacitance values will range from about 0.01 nanofarads to about 0.2 nanofarads.

In this embodiment of the present invention, extractor 1 rectifies and stores energy from incidental vibrational, compressional, and torque forces by first converting them to electricity with capacitors 12 and 14 and then using the electricity to charge rechargeable energy source 10. For example, a power supply on a credit card would be subject to many mechanical forces as it moves around in a wallet. When the force results in a large enough voltage to forward bias the diodes, the capacitor current will recharge the energy source. A small reverse current through the diodes charges the capacitor plates to a voltage level near the energy source voltage.

FIGS. 2–12 are sectional and perspective views illustrating fabrication stages of a process for one mechanical implementation that can be used for capacitors of FIG. 1.

In an embodiment wherein capacitors 31 and 33 of the type shown in the fabrication process of FIGS. 2–12 are used for capacitors 12 and 14 of FIG. 1, the integrated environmental energy extractor includes fixed first and third capacitor plates (electrodes) 32 and 30 (which can, in one embodiment, be attached to substrate 214); and a flexible second capacitor plate 34 positioned between the first and third capacitor plates. In this embodiment, the first and second capacitor plates comprise first capacitor 31 and the second and third capacitor plates comprise second capacitor 33. Movement of the second capacitor plate toward one of the first and third capacitor plates changes the capacitance of each of the first and second capacitors. In one embodiment, the second capacitor plate comprises a cantilever supported by a substrate 214. Any plate with an unsecured end will bend and oscillate at a resonant frequency when exposed to a vibrational spectrum of frequencies.

A capacitor's capacitor plate that is nearest to energy source 10 is positively charged when in close proximity to the other capacitor plate due to the capacitance increase and the corresponding voltage decrease creating reverse bias conditions (reverse leakage) of diodes 20 and 22 which respectively charge the capacitors. When the capacitor plates move apart, the capacitor voltage is increased. If the capacitor voltage is increased to a value above the forward bias voltage of its respective diode 20 or 22, the energy source 10 of FIG. 1 is then charged through rectifier 16 or 18. Preferably the capacitor plates are insulated to prevent an electrical short from occurring as a result of a violent force. An oxidized metal is expected to be sufficient to withstand moderate contact.

Figure 2:
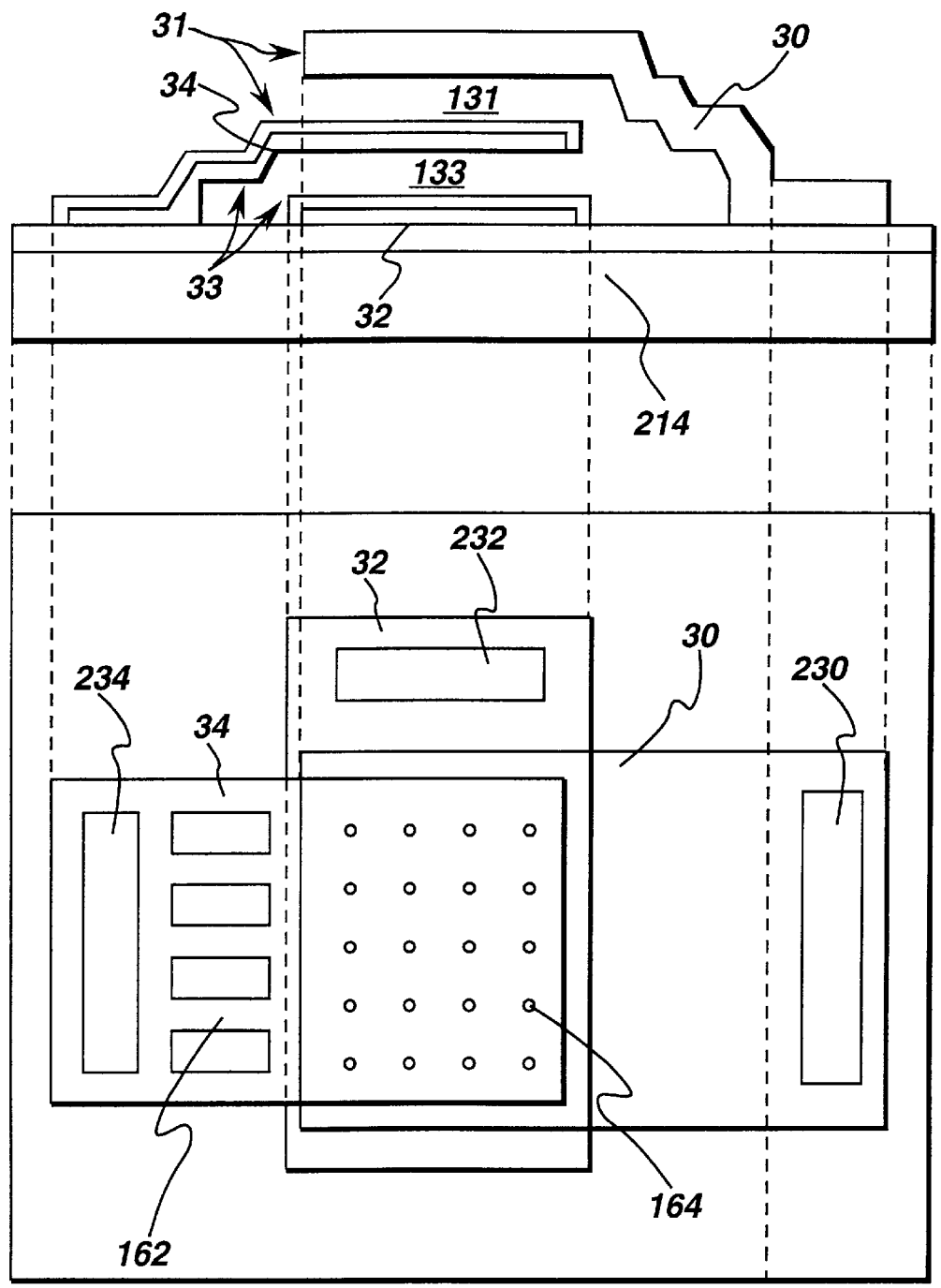
FIGS. 2–12 are sectional and perspective views illustrating fabrication stages of a process for one mechanical implementation that can be used for capacitors of FIG. 1.

The embodiment of FIG. 1 is a useful circuit for the capacitors of FIG. 2 because electrostatic forces generated by charge supplied by the energy source can be balanced to preserve the range of motion which might otherwise be consumed by the strain response of the second capacitor plate's lever. The embodiment of the combination of FIGS. 1 and 2 is insensitive to voltage variations through the charging cycle and permits lower Young's elasticity modulus material that can create greater capacitance change per amount of force on the extractor (and thus greater efficiency).

The top planar view of FIG. 2 shows that the first capacitor plate 32 is oriented perpendicularly to the other capacitor plates for purposes of example only. Other layouts are equally applicable to the present invention. Also shown in the top view of FIG. 2 are terminals 230, 232, and 234 of the capacitor plates, and optional hinge openings 162 and air holes 164 of the second capacitor plate.

Figure 3:
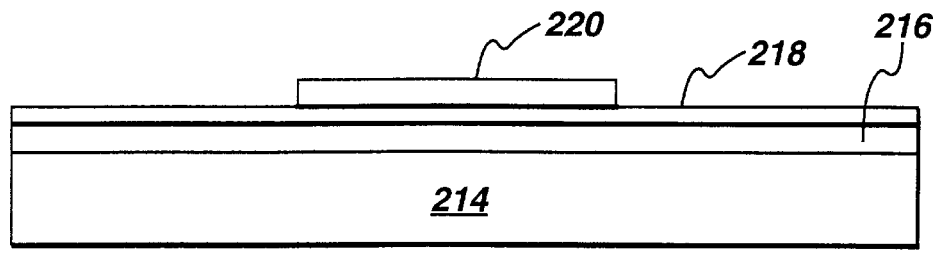
Figure 4:
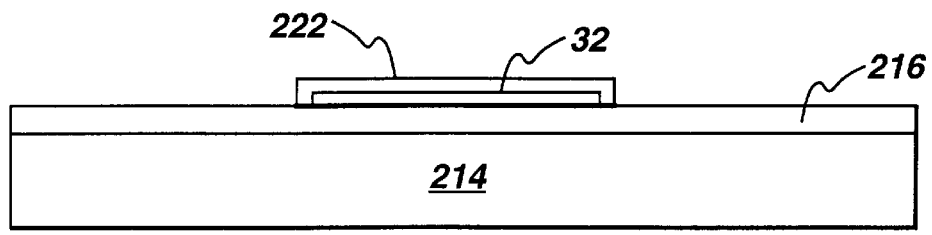

The following is a description of a process for fabricating the embodiment of FIG. 2. First, substrate 214 is prepared for attachment of first capacitor plate 32. In one embodiment, as shown in FIG. 3, the substrate comprises a chemically-mechanically polished semiconductor wafer, 20 to 25 mil thick. If the substrate comprises a semiconductor such as silicon, for example, active electronic components, such as diodes and transistors, can also be formed on the substrate using conventional integrated circuit technology. Therefore, in addition to the two capacitors, the rest of the extractor circuit can be integrated on substrate 214. Because of the high temperature processing required by diodes and transistors, they are preferably fabricated before MEMS processing.

The substrate surface can be passivated, for example, by forming a first passivation layer 216 by chemical vapor depositing (CVD) a 10,000 Å thick silicon dioxide layer at 450° C. and forming a second passivation layer 218 by chemical vapor depositing a 4000 Å thick polycrystalline silicon (polysilicon) layer and doping it with phosphorus from a $PoCl_3$ liquid source at 900° C. to increase its electrical conductivity. The second passivation layer can be patterned with photoresist 220 to form the first capacitor plate 32 (shown in FIG. 4).

To prevent electrical shorting between capacitor plates, electrical insulation such as insulating layer 222 is useful. To provide insulation for the first capacitor plate, if polysilicon is used, it can be thermally oxidized at 900° C. in a wet ambient to grow 1000 Å of silicon dioxide. Insulating layer 222 (or alternatively an insulating layer on a side of the second capacitor plate facing the first capacitor plate) can prevent electrical shorts between the first and second capacitor plates.

Figure 5:
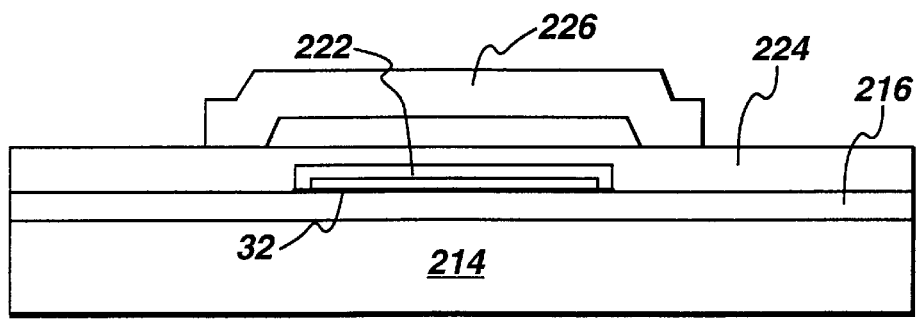
Figure 6:
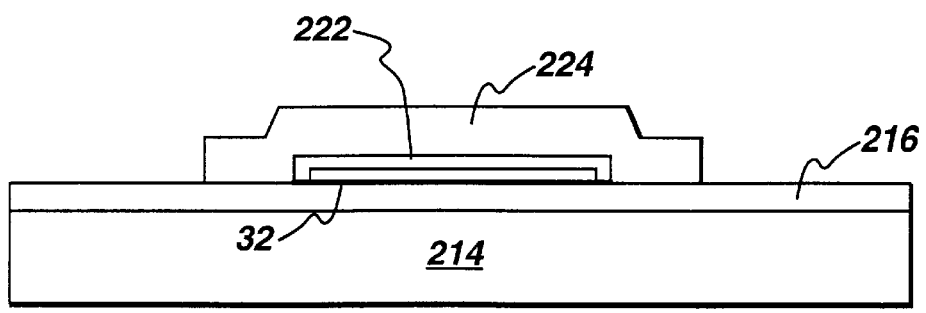

As shown in FIGS. 5 and 6, a release layer 224 is formed over first capacitor plate 32 and patterned with photoresist 226. In one embodiment, the release layer comprises a 5000 Å thick phosphosilicate glass film deposited at 450° C. from a gaseous mixture of $PH_3$, $SiH_4$, $O_2$ and $N_2$ in a quartz reactor (not shown). A phosphorus content of 7 to 9 mol % enhances the film etch rate in a buffered HF (hydrofluoric acid) aqueous solution for later removal of this film without damaging the surrounding layers.

Figure 7:
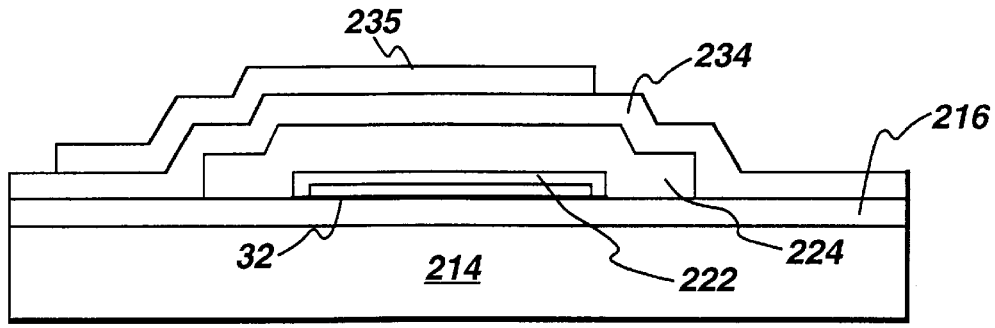
Figure 8:
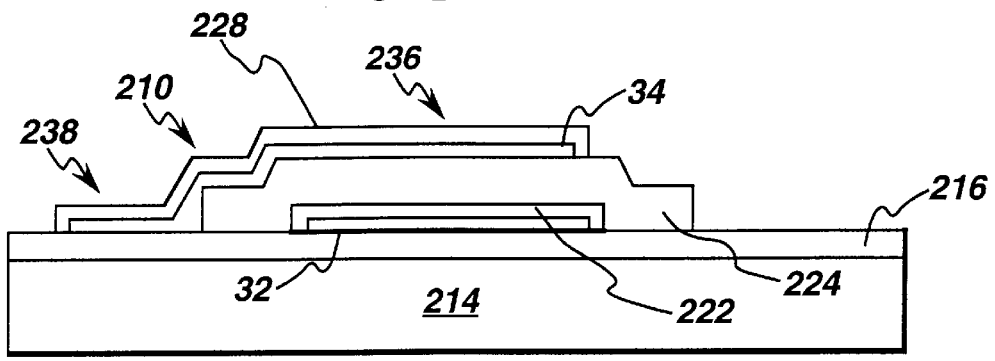

As shown in FIGS. 7 and 8, second capacitor plate 34 is then formed with an optional second insulating layer 228. In one embodiment, the second capacitor plate and second insulating layer are formed in a similar manner (with photoresist such as photoresist 235 for example) as discussed with respect to FIGS. 3 and 4. The pattern of second capacitor plate 34 includes two connected regions, the first region 236 overlapping the release layer 224 and the first capacitor plate 32, and the second region 238 situated over the substrate 214. The connecting edge between these regions, formed by step 210, provides electrical and mechanical continuity due to the CVD step coverage. This ensures that after removal of the release layer 224 at the end of the process, first region 236 will form an elevated cantilever arm 236, while second region 238 will anchor the arm to the substrate and electrically connect it to a desired circuit.

To enhance the response of the cantilever arm 236 to environmental forces, the pattern of the second capacitor plate 34 may include either or both of two additional features shown in FIG. 2. To decrease the stiffness of the cantilever hinge formed by step 210 without changing the proof mass, the step can be patterned to form a set of narrow beams which are obtained by opening rectangular holes (shown as hinge openings 162) in the second capacitor plate 34 over step 210. To reduce the aerodynamic resistance during the cantilever motion by allowing free air flow across the second capacitor plate during deflection and thereby avoid the friction and resistance of lateral air motion around the moving plate, an array of air holes 164 can be opened in the cantilever arm through second capacitor plate 34 and second insulating layer 228. The openings in the second capacitor plate 34 serve the additional function of facilitating the removal of the release layer by creating multiple inlets for the etchant and therefore reducing the total etch time required for releasing the cantilever beam.

Figure 9:
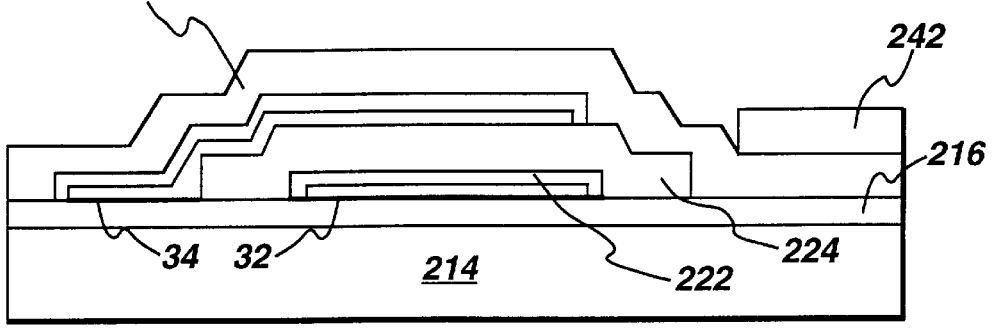
Figure 10:
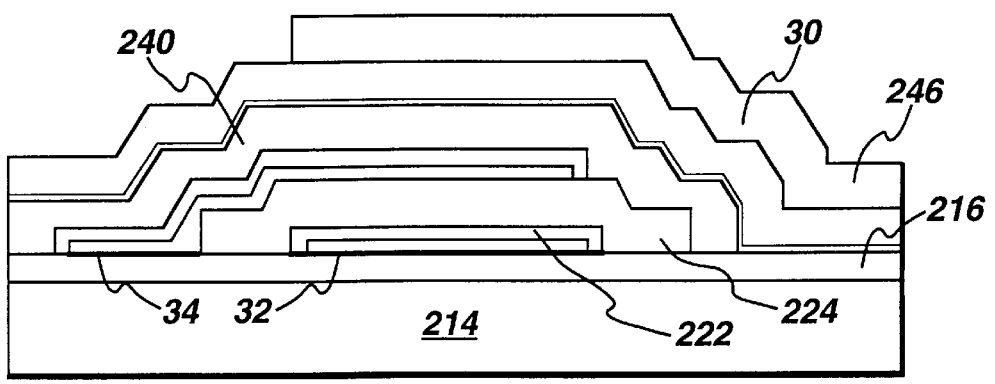
Figure 11:
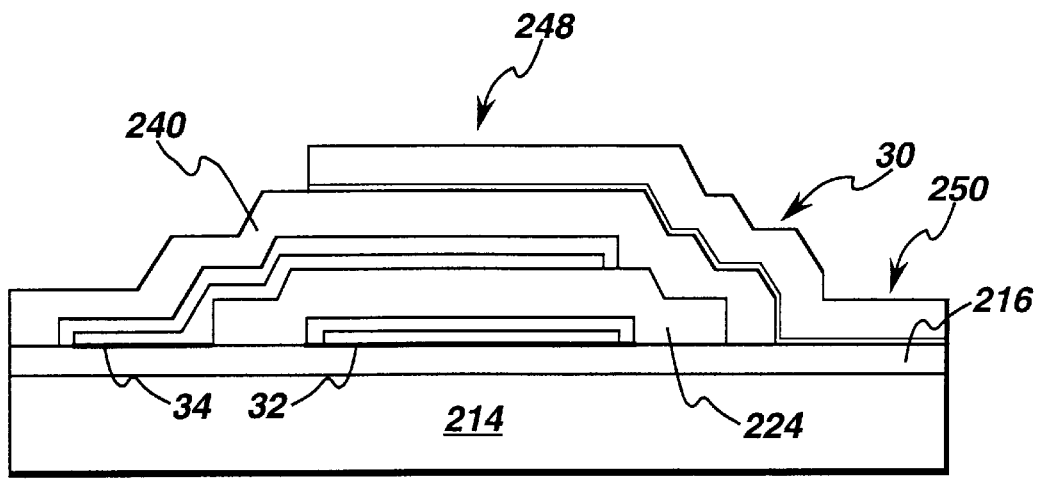

FIGS. 9–11 illustrate process steps in fabricating third capacitor plate 30. A second release layer 240 is applied and is patterned, with photoresist 242 for example, such that a portion of a subsequently applied first capacitor layer 30 can be attached to the substrate. In one embodiment, the second release layer comprises a 5000 Å thick phosphosilicate glass film deposited at 450° C. from a gaseous mixture of $PH_3$, $SiH_4$, $O_2$ and $N_2$ in a quartz reactor.

The material of third capacitor plate 30 has a thickness sufficient to avoid external shock-induced deflections and therefore achieve the desired variable capacitance of capacitor 31. In one embodiment, third capacitor plate 30 is formed by a thin (1000 Å) sputtered nickel layer 242, overlapped by a thicker (20,000 Å) electroplated nickel layer 244. Other appropriate materials for the third capacitor plate which can have appropriate stiffness and resistance to etching solutions for the release layers include, for example, copper, molybdenum, tungsten and chromium. The third capacitor plate material can be masked and etched through photoresist 246, for example. The material not covered by photoresist is removed by either wet or dry etching using conventional etching techniques.

The pattern of third capacitor plate 30 as shown in FIG. 11 includes two regions, the first region 248 formed over the encroachment of the first and second capacitor plates, and the second region 250 over the substrate 214 to create the cantilever anchor and the external electrical terminal. The release layers 224 and 240 can be removed by immersion in an aqueous HF solution, for example until the cantilever arm of the second capacitor plate is free to move within the air gaps 131 and 133.

Figure 12:
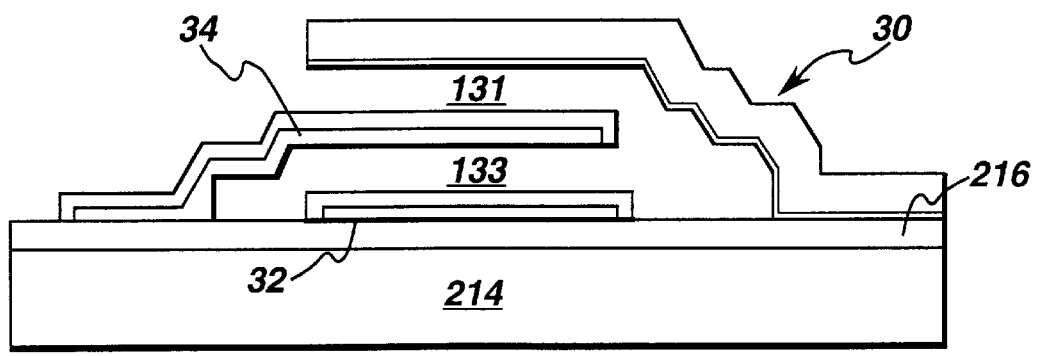

Although three capacitor plates are shown in FIG. 12, the embodiment can be extended so that additional alternating flexible and fixed capacitor plates (not shown) are formed above the original three capacitor plates such that flexible capacitor plates are interdigitated between fixed capacitor plates. This embodiment can result in space savings for some applications.

Additionally, although the capacitor fabrication process of FIGS. 1–12 is shown as forming capacitor plates parallel to a surface of substrate 214, in an alternative embodiment, the capacitor plates are formed in a perpendicular orientation with respect to substrate 214. In this embodiment (not shown), deep trenches can be formed in the substrate, fixed capacitor plates can be formed on opposing walls of the trenches, and a flexible capacitor plate can be formed between the fixed capacitor plates using a release layer similar to that discussed above, for example.

Figure 13:
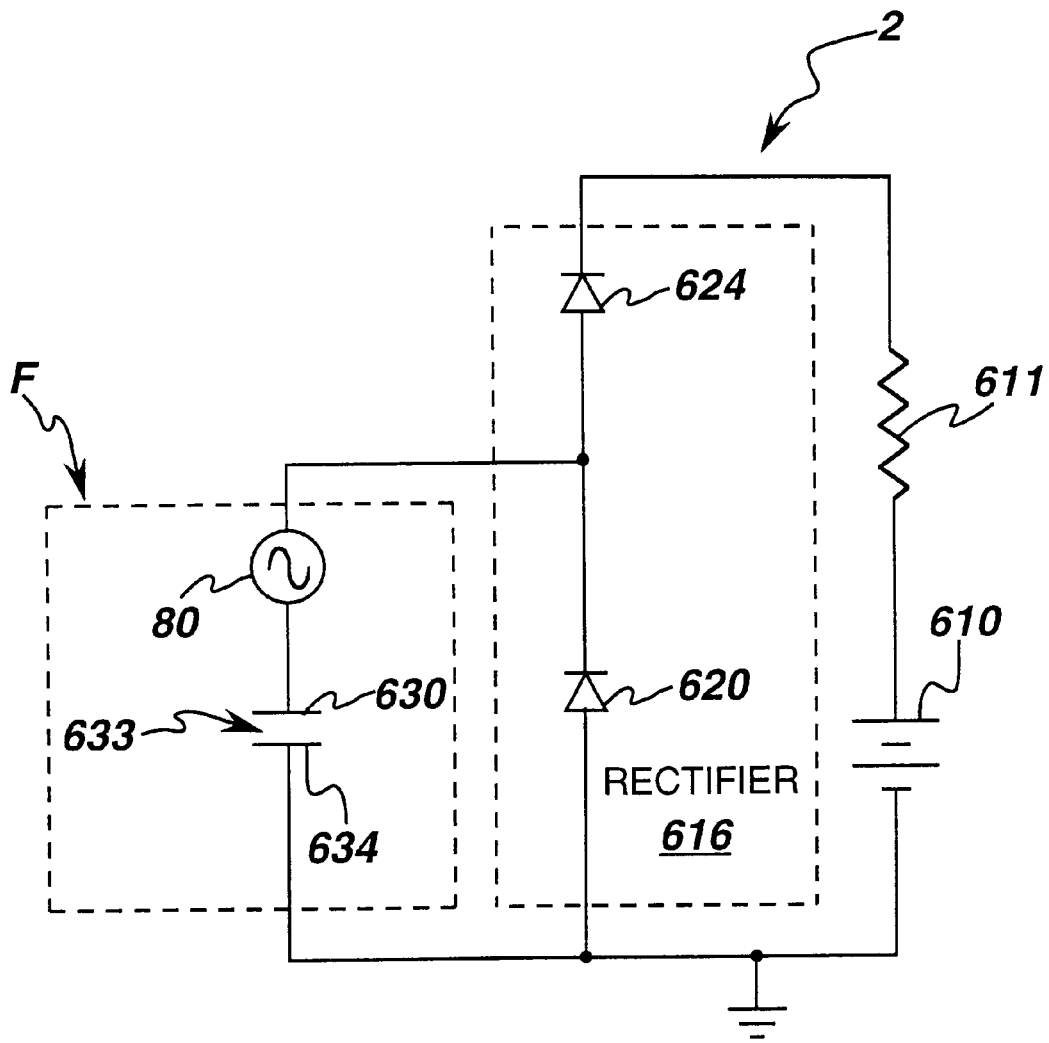
FIG. 13 is a circuit diagram of another embodiment of a charging circuit.

FIG. 13 is a circuit diagram of another embodiment of an extractor 2. FIG. 13 illustrates a circuit diagram for a single capacitor embodiment. In this embodiment, a force 80 acts on capacitor plates 630 and 634 of a capacitor 633, and rectifier 616 includes two diodes 620 and 624 with the capacitor being coupled in parallel across diode 620.

One type of capacitor which can be used in the embodiment of FIG. 13, for example, is a single capacitor which can be formed with first and second capacitor plates 32 and 34 as discussed with respect to FIGS. 3–8 which then has the release layer 224 removed and does not require the addition of third capacitor plate 30. The step region 210 acts as an arm which alternately brings the capacitor plates closer together and further apart depending on the vibration, compressional and torque forces to which the capacitor is subjected.

Figure 14:
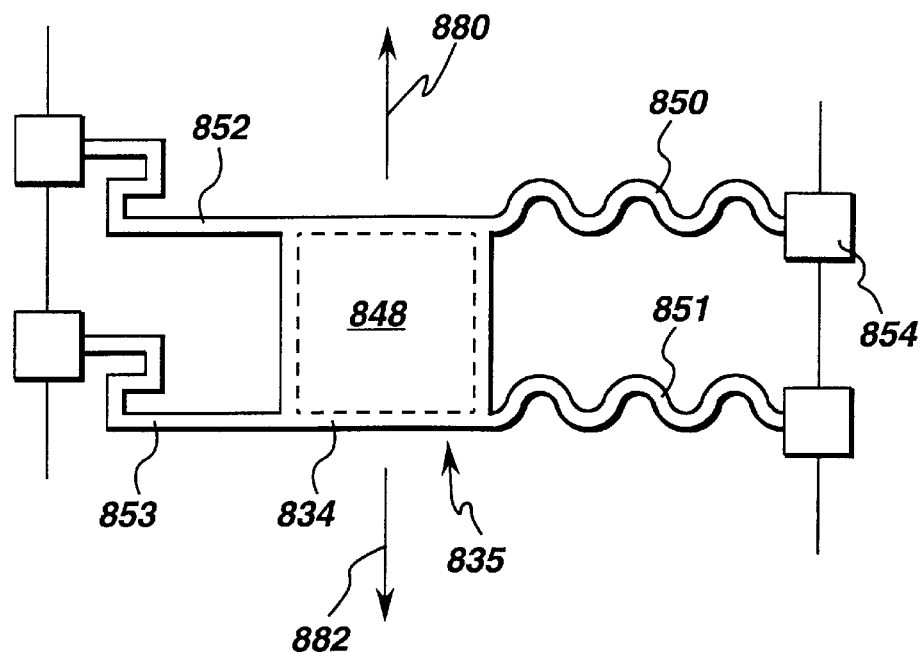
FIGS. 14 and 15 are top and sectional side views of an alternate embodiment for a capacitor of the present invention.
Figure 15:
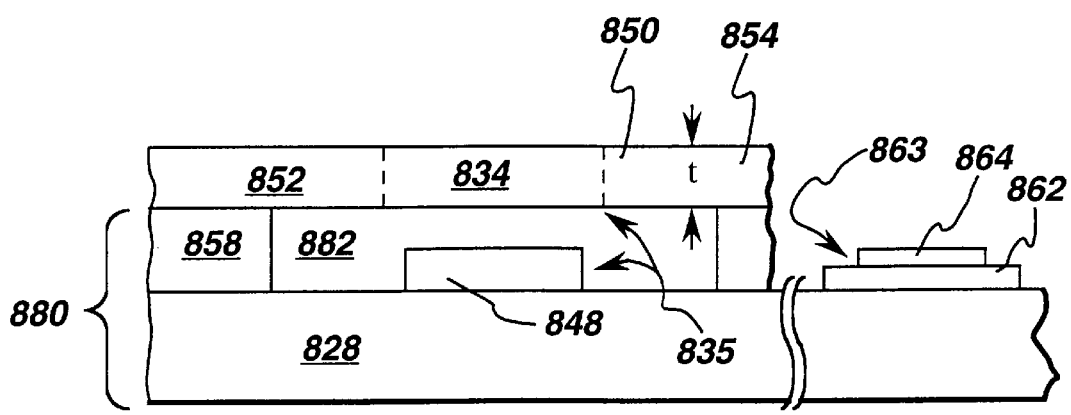

FIGS. 14 and 15 are top and sectional side views of an related embodiment for a capacitor of the present invention. In this embodiment, a capacitor 835 comprises a fixed first capacitor plate 848 overlying a portion of a substrate 880; a movable second capacitor plate 834; and at least one (as in the embodiment discussed above with respect to FIG. 13) and preferably multiple flexible arms 850, 851, 852, 853 attached to the second capacitor plate for spacing the second capacitor plate in substantially in parallel apart from the first capacitor plate and the dielectric layer and permitting the second capacitor plate to alternately move across the first capacitor plate.

Substrate 880 may comprise any structurally appropriate material and may comprise either an integral structure with a well 882 or a multi layer structure with a base layer 828 and an additional layer 858 to space the movable second capacitor plate over the fixed first capacitor plate. The second capacitor plate can be applied over a release layer similar to the release layers described above with respect to FIGS. 5–12. In an alternative embodiment, the release layer and second capacitor plate material can be used to form arms with steps similar to those of the third capacitor plate 34 of FIG. 12. In this embodiment, no well or additional substrate layer would be needed.

The flexible arms are designed to permit movable second capacitor plate 834 to move in one or both directions represented by arrows 880 and 882 across fixed first capacitor plate 848. For purposes of example only, arms 850 and 851 are shown as wavy springs and arms 852 and 853 are shown as leaf springs. Typically all the arms would be of the same type. The arms need a thickness t sufficient to support the movable second plate and prevent the movable second plate from falling into contact with the fixed first plate. In one embodiment, the movable second plate comprises nickel having a thickness ranging from 15,000 to 25,000 angstroms. If the substrate comprises a semiconductor, the first capacitor plate may comprise a polysilicon material, for example.

FIG. 15 further includes a side view of one embodiment of a Schottky diode 863 for use with the present invention wherein a dielectric material 862 such as silicon is below a barrier metal 864 such as titanium, platinum, gold, or nickel having a thickness ranging from about 1000 angstroms to about 1 micrometer.

Figure 16:
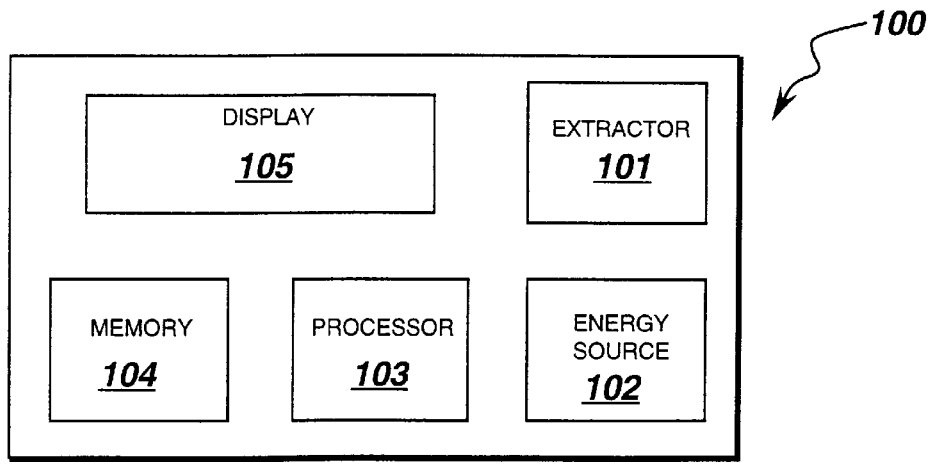
FIG. 16 is a top view of a credit card in which a charging circuit of the present invention can be positioned.

FIG. 16 is a top view of a smart card 100 (such as a multi-function credit card) in which an extractor 101 of the present invention can be positioned with an energy source 102, a processor 103, a memory 104 and a display 105. One or more capacitors can be integrated into such a card and rechargeable energy source 102 as the card is subjected to mechanical forces as it moves in a wallet or is swiped in a card reader, for example. The rechargeable energy source can then supply power to the processor, memory, and display. These elements are shown as co-planar in FIG. 16. The elements can be stacked, if desired, and if performed in a manner that provides an appropriate thinness of the smart card.

Figure 17:
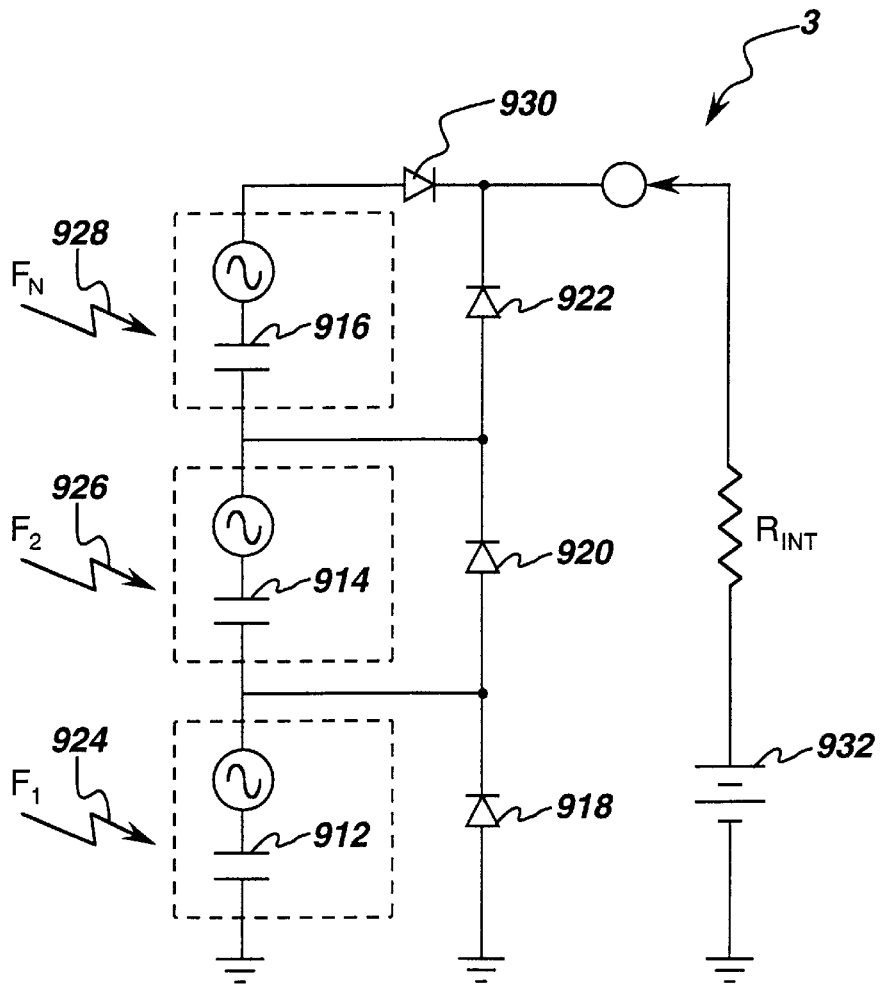
FIG. 17 is a circuit diagram of a configuration in which charging circuits can be cascaded.

FIG. 17 is a circuit diagram of an extractor 3 configuration in which charging capacitors can be cascaded to increase the charging voltage. In this embodiment, at least two capacitors, shown as capacitors 912, 914, and 916, are coupled in series with each being coupled across a respective diode, shown as diodes 918, 920, and 922, and each capacitor being subject to a mechanical force represented as forces 924, 926, and 928. Diode 930 substantially prevents current from flowing from rechargeable energy source 932 to the capacitors.

In one embodiment, the capacitors can be constructed so that they have different resonant frequencies in order to assure that all of the capacitors occasionally exhibit a simultaneous maximum magnitude. In another embodiment, the capacitors can be mechanically coupled so that they will oscillate in phase at the same frequency.

Multiple capacitors can be distributed spatially. When a smart card such as shown in FIG. 16 is used, the capacitors can be positioned at different locations on the card and will experience different deformation torques since the card will likely not be uniformly deformed.

Figure 18:
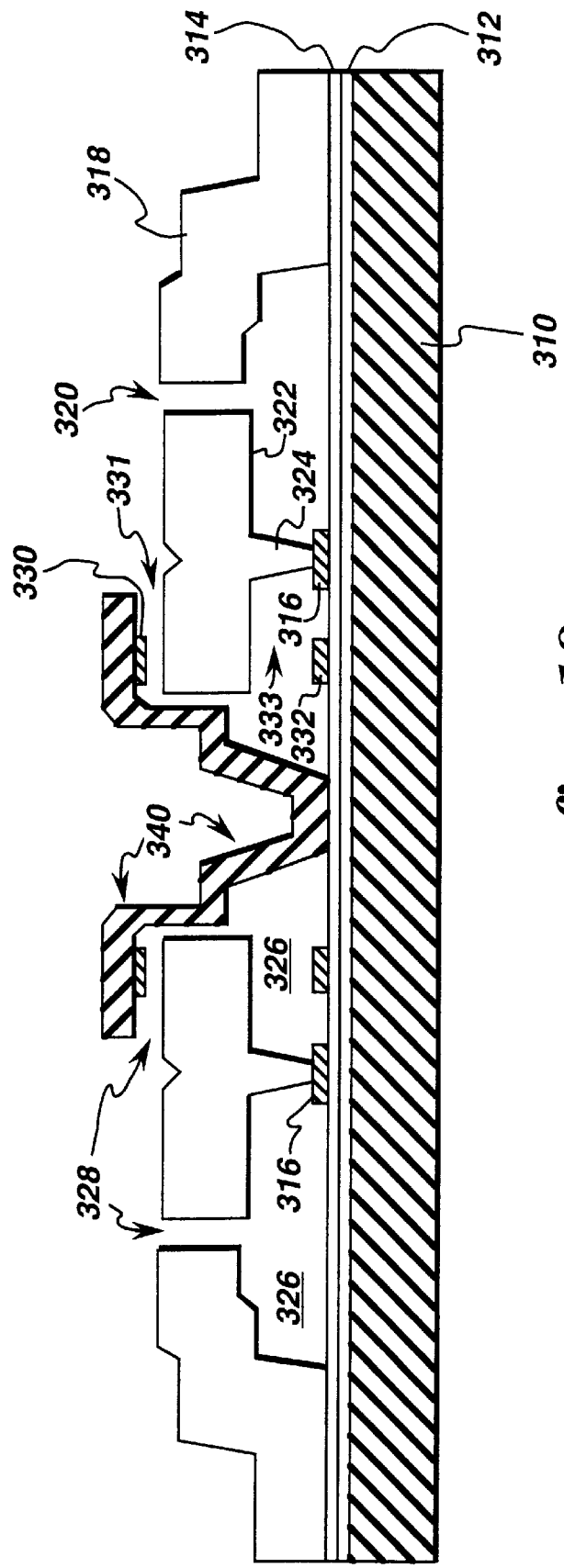
FIGS. 18 and 19 are sectional side and top views of an alternate embodiment for a capacitor of the present invention.
Figure 19:
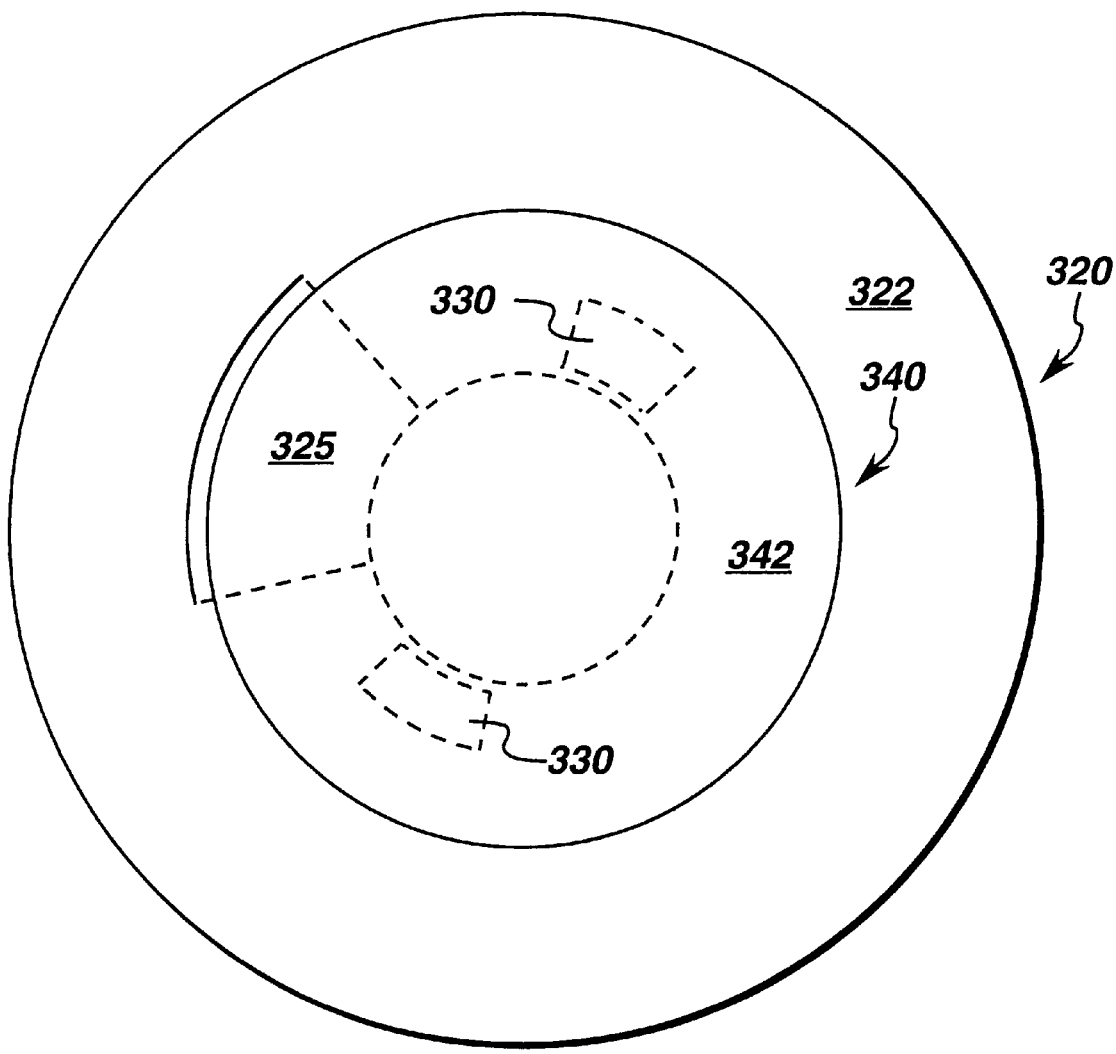

FIGS. 18 and 19 are sectional side and top views of additional alternate embodiments for capacitors of the present invention. In these embodiments, at least one capacitor has a capacitance which varies with the rotation of a rotor 320.

For example, in one embodiment, a capacitor includes fixed first and second capacitor plates 330 and 332 with rotor 320 positioned between the first and second capacitor plates such that rotation of the rotor changes a capacitance of the capacitor. In this embodiment, the rotor preferably comprises a non-uniform dielectric material such that one or more sections 325 of the rotor are either missing or comprise a different dielectric material than other sections rest of rotor 320.

In another embodiment, a capacitor includes a fixed first capacitor plate 330 or 332 and a second capacitor plate which is formed on rotor 320. In this embodiment, rotor 320 itself may comprise an electrically conductive material or a dielectric material supporting an electrically conductive pattern 325.

In still another embodiment, a pair of capacitors 331 and 333 includes fixed first and third capacitor plates 330 and 332 and a rotor 320 including a second capacitor plate (formed by the entire rotor 320 or a separate pattern 325) positioned between the first and third capacitor plates. The first and third capacitor plates comprise a first capacitor 331 and the second and third capacitor plates comprise a second capacitor 332.

Rotor 320 of the present invention can be fabricated using conventional micromachining processes with appropriate changes or additions being made to create the capacitors.

One example of a micromachining process is described in Mehregany, "Microelectromechanical Systems," Circuits and Devices, IEEE 1993 wherein a layer 312 of silicon dioxide ($SiO_2$) is formed on a silicon substrate 310 followed by application of a layer of silicon nitride ($Si_3N_4$) and application of a layer of a polysilicon electric shield (not shown). Next a first silicon dioxide release layer (not shown) is formed and patterned in the areas shown generally as areas 326. Then rotor 320 and stator 318 are formed of doped polysilicon and patterned. This step is followed by application of a second silicon dioxide release layer (not shown) which is formed and patterned in the areas 328 prior to application of a doped polysilicon bearing 340. Lastly, the first and second release layers are etched.

The process described in Mehregany can be modified in accordance with the present invention in several respects. Preferably, at least portions of stator 318 and bearing 340 have doping levels such that they are not electrically conductive.. In one modification, one or more capacitor plates 330 and/or 332 are formed of a material such as polysilicon doped to provide electrical conductivity. For example, rather than patterning a polysilicon electric shield over layer 314, one or more capacitor plates 332 can be formed prior to application of a first release layer in areas 326. Similarly, one or more capacitor plates 330 can be formed on the second release layer prior to application of bearing 340 or the bearing can be selectively doped to create the one or more capacitor plates 330.

In a second modification, rotor 320 is patterned such that one or more sections 325 of the rotor are either missing or include a different material than other sections of rotor 320. To impart vibrational force to the configurations of FIGS. 18 and 19, it is useful to design an imbalance in the moment of inertia of the rotor.

As discussed above, the rotor may comprise a dielectric, electrically non-conductive material portion 322 for changing the dielectric constant between two capacitor plates as the rotor rotates, the rotor may comprise an electrically conductive material 322 and serve as a capacitor plate, or the rotor may comprise a combination of electrically conductive 325 and non-conductive 322 materials. If the entire rotor comprises an electrically conductive material, it is useful to pattern an electrically conductive rotor contact 316 for portion 324 of rotor 320 when patterning the one or more capacitor plates 332.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An integrated environmental energy extractor comprising:
    a rechargeable energy source;
    fixed first and third capacitor plates;
    a flexible second capacitor plate positioned between the first and third capacitor plates, the first and second capacitor plates comprising a first capacitor and the second and third capacitor plates comprising a second capacitor such that movement of the second capacitor plate toward one of the first and third capacitor platens changes a capacitance of each of the first and second capacitors;
    first and second rectifiers coupled respectively to the first and second capacitors, each rectifier permitting current to flow from the respective capacitor to the rechargeable energy source when the respective capacitor exceeds a predetermined voltage and for substantially preventing current from flowing from the rechargeable energy source to the respective capacitor.

2. The extractor of claim 1 wherein the second capacitor plate includes a cantilever.

3. The extractor of claim 2 further including electrical insulation on at least one of the first and second capacitor plates.

4. The extractor of claim 2 further including a substrate, at least a portion of each of the first, second, and third capacitor plates being coupled to the substrate.

5. The extractor of claim 4 wherein the substrate comprises a semiconductor and wherein the first capacitor plate comprises polysilicon.

6. The extractor of claim 4 wherein the substrate comprises a semiconductor and further including a diode fabricated on the substrate.

7. A method for fabricating a pair of capacitors comprising:
applying a first capacitor plate patterned on a substrate;
applying a first release layer patterned over the first capacitor plate;
applying a second capacitor plate patterned over the first release layer and on the substrate;
applying a second release layer patterned over the second capacitor plate;
applying a third capacitor plate patterned over the second release layer and on the substrate; and
removing the first and second release layers.

8. The method of claim 7 wherein applying the second capacitor plate comprises applying the second capacitor plate such that, when the first and second release layers are removed, a first region of the second capacitor plate forms a cantilever arm, a second region of the capacitor plate is attached to the substrate, and a step of the second capacitor plate operates as a hinge between the first and second regions to permit movement of the cantilever arm.

9. The method of claim 8 wherein the step includes hinge openings.

10. The method of claim 8 wherein the cantilever arm includes air holes.

11. An integrated environmental energy extractor comprising:
a rechargeable energy source;
a capacitor comprising first and second substantially parallel capacitor plates responsive to a force for alternately moving the first and second capacitor plates closer together and further apart and thereby changing a capacitance of the capacitor;
a rectifier for permitting current to flow from the capacitor to the rechargeable energy source when the capacitor exceeds a predetermined voltage and for substantially preventing current from flowing from the rechargeable energy source to the capacitor.

12. The extractor of claim 11, wherein
the first capacitor plate is supported by a substrate; and
the second capacitor plate has a first portion situated above and spaced apart from the first capacitor plate and a second portion supported by the substrate.

13. An integrated environmental energy extractor comprising:
a rechargeable energy source;
a substrate;
a fixed first capacitor plate overlying a portion of the substrate;
a movable second capacitor plate;

flexible arms attached to the second capacitor plate for spacing the second capacitor plate in parallel apart from the first capacitor plate and permitting the second capacitor plate to alternately move across the first capacitor plate; and a rectifier for permitting current to flow from the capacitor to the rechargeable energy source when the capacitor exceeds a predetermined voltage and for substantially preventing current from flowing from the rechargeable energy source to the capacitor.

14. A capacitor comprising:

a fixed first capacitor plate overlying a portion of a substrate;

a movable second capacitor plate; and flexible arms attached to the second capacitor plate for spacing the second capacitor plate in parallel apart from the first capacitor plate and permitting the second capacitor plate to alternately move across the first capacitor plate.

15. A smart card comprising:

a rechargeable energy source;

at least one integrated environmental energy extractor including:

at least one capacitor having first and second capacitor plates responsive to a mechanical force which changes the voltage between the first and second capacitor plates; and a rectifier for permitting current to flow from the at least one capacitor to the rechargeable energy source when the at least one capacitor exceeds a predetermined voltage and for substantially preventing current from flowing from the rechargeable energy source to the at least one capacitor; and a processor, the rechargeable energy source supplying power to the processor.

16. The smart card of claim 15 wherein the rechargeable energy source, the extractor, and the processor are substantially coplanar.

17. An integrated environmental energy extractor for a rechargeable energy source comprising:

a plurality of series-coupled capacitors each having first and second capacitor plates responsive to a mechanical force which changes the voltage between the first and second capacitor plates;

a plurality of series-coupled diodes, each diode coupled in parallel across a respective one of the plurality of capacitors, each diode permitting current to flow from the respective capacitor to the rechargeable energy source when the respective capacitor exceeds a predetermined voltage; and a current control diode coupled in series between the capacitors and the rechargeable energy source for substantially preventing current from flowing from the rechargeable energy source to the capacitors.

18. The extractor of claim 17 wherein some of the plurality of capacitors have different resonant frequencies than others of the plurality of capacitors.

19. The extractor of claim 17 wherein the plurality of capacitors are mechanically coupled and oscillates in phase at a common frequency.

20. An integrated environmental energy extractor comprising:

a rechargeable energy source;

fixed first and third capacitor plates;

a rotor including a second capacitor plate positioned between the first and third capacitor plates, the first and third capacitor plates comprising a first capacitor and the second and third capacitor plates comprising a second capacitor, wherein rotation of the rotor changes a capacitance of the first and second capacitors;

first and second rectifiers coupled respectively to the first and second capacitors, each rectifier permitting current to flow from the respective capacitor to the rechargeable energy source when the respective capacitor exceeds a predetermined voltage and for substantially preventing current from flowing from the rechargeable energy source to the respective capacitor.

* * * * *